United States Patent [19]

Grannen, III

[11] Patent Number: 4,481,161

[45] Date of Patent: Nov. 6, 1984

[54] PRESSURE STABILIZED INJECTION MOLD

[75] Inventor: Walter A. Grannen, III, Bargersville, Ind.

[73] Assignee: E-W Mold & Tool Company, Inc., Indianapolis, Ind.

[21] Appl. No.: 458,289

[22] Filed: Jan. 17, 1983

[51] Int. Cl.³ .............................................. B29F 1/00
[52] U.S. Cl. ................................ 264/328.8; 425/468; 425/570
[58] Field of Search ................... 264/328.8; 425/468, 425/570

[56] References Cited

U.S. PATENT DOCUMENTS

| 3,473,197 | 10/1969 | Wilds et al. | 425/468 |
| 3,509,603 | 5/1970 | Halsall et al. | 425/468 |
| 3,816,047 | 6/1974 | Mohler | 425/577 |
| 3,972,737 | 8/1976 | Sullivan et al. | 425/468 |
| 3,977,821 | 8/1976 | Lovejoy | 425/570 |
| 4,278,417 | 7/1981 | Wilds et al. | 425/577 |

Primary Examiner—Donald Czaja
Assistant Examiner—V. Fischbach
Attorney, Agent, or Firm—Woodard, Weikart, Emhardt & Naughton

[57] ABSTRACT

An injection mold assembly having means to stabilize interior components. A male mold has a plurality of upstanding cores with free distal ends extending into a female mold. A plurality of wedges extending from the female mold are positioned between some of the cores to limit movement thereof as plastic material is injected into the mold assembly at other locations to cooperatively with the wedges limit movement of the free distal core ends.

13 Claims, 5 Drawing Figures

PRESSURE STABILIZED INJECTION MOLD

BACKGROUND OF THE INVENTION

Many different types of polyolefin containers having interior compartments are formed by injection molding plastic between a female and male mold. The male mold typically includes a plurality of upstanding spaced apart cores fixedly mounted at their bottom ends to a base. The cores are spaced apart to form the partitions separating the various compartments within the container. Due to the large injection pressure, in the neighborhood of 20,000 psi, the free distal ends of the cores move thereby causing the compartment partitions to be irregular in thickness. This problem was solved by the invention disclosed in U.S. Pat. No. 3,473,197 wherein the free distal ends of the cores are rigidly secured together by wedges mounted to the female mold and extending between the cores of the male mold. A different approach is disclosed in U.S. Pat. No. 4,278,417 wherein transverse locking pins are provided on each core to engage the adjacent core.

The size of the compartment molded in a container is determined by the size of the respective core on the male mold. Thus, small compartments require relatively thin cores decreasing the rigidity of the core and allowing for freer movement of the free distal core end. Further, it becomes more difficult to incorporate the transverse pin locking mechanism disclosed in U.S. Pat. No. 4,278,417 in a thin core. It is therefore desirable to provide a new and effective means for controllling the transverse movement of the free distal core end in molds having relatively thin cores. Disclosed herein is such a device and method.

SUMMARY OF THE INVENTION

One embodiment of the present invention is a mold assembly for injection molding a container having parallel thin walled partitions comprising a base, a plurality of cores cantileveredly mounted to the base, the cores spaced apart defining partition forming spaces and having free distal ends to form the bottom of the container, a cavity assembly movably mounted to enclose the cores but spaced therefrom across a gap to form the container therein, parallel wedges mounted on the cavity assembly and movable therewith to an engaging position whereat the wedges extend into some of the spaces between and against adjacent free distal ends of the cores limiting movement together of the cores so engaged, side locking means mounted with the cavity assembly for limited motion transverse to the direction of core extension and when in one position extending into sideways engagement with the outermost cores limiting outward movement thereof, and injection means mounted with the cavity assembly and aligned with those of the spaces not associated with the wedges and operable to inject plastic material into those spaces at a pressure sufficient to limit movement of the cores forming those spaces and cooperatively with the wedges limiting movement of the cores and by stabilizing the free distal ends forming the partition of uniform thickness.

A further embodiment of the present invention a separable mold assembly for injection molding a plastic container having compartments separated by thin walls comprising a male mole with deep longitudinal slots extending transversely thereacross forming a plurality of upstanding cores to form the compartments separated by the thin walls, a female mold slidably mounted to the male mold and spaced therefrom to form the container therebetween, a plurality of wedge shaped fingers mounted to the female mold and movable into the slots as the female mold closes on the male mold to limit movement of the cores, a plurality of injector means mounted to the female mold and aligned with at least one of the slots to inject plastic material into the slots and between the male mold and female mold forming the container with the thin walls, the injector means aligned with slots not having wedges therein to inject the material at a certain pressure to cooperatively with the wedges limit movement of the cores and, resistive means connected to the wedges, injector means and female and male molds to limit movement thereof as the plastic material reaches the certain pressure.

Yet another embodiment of the present invention is a method of injection molding a plastic container having compartments separated by thin walled partitions comprising the steps of spacing apart a plurality of upstanding cores of a male mold each a distance equal to the desired thickness of the partitions, positioning a female mold around the male mold but spaced therefrom to form the container therebetween, inserting wedges between some of the cores, injecting plastic material at a certain pressure with injectors between the remaining cores and between the male mold and the female mold; and maintaining the wedges in place to limit movement of cores engaged by the wedges while maintaining the pressure to limit movement of the remaining cores until the plastic material has flowed between all of the cores and between the cores and female mold.

It is an object of the present invention to provide a new and effective means for limiting transverse movement of the free distal core end of a male injection mold.

Yet another object of the present invention is to provide an injection mold for producing a container having relatively small sized interior compartments separated by partitions having uniform thickness.

A further object of the present invention is to provide a new method of injection molding a container having interior walls of uniform thickness.

Related objects and advantages of the present invention will be apparent from the following description.

DESCRIPTION OF THE PREFERRED EMBODIMENTS

Figure 2:
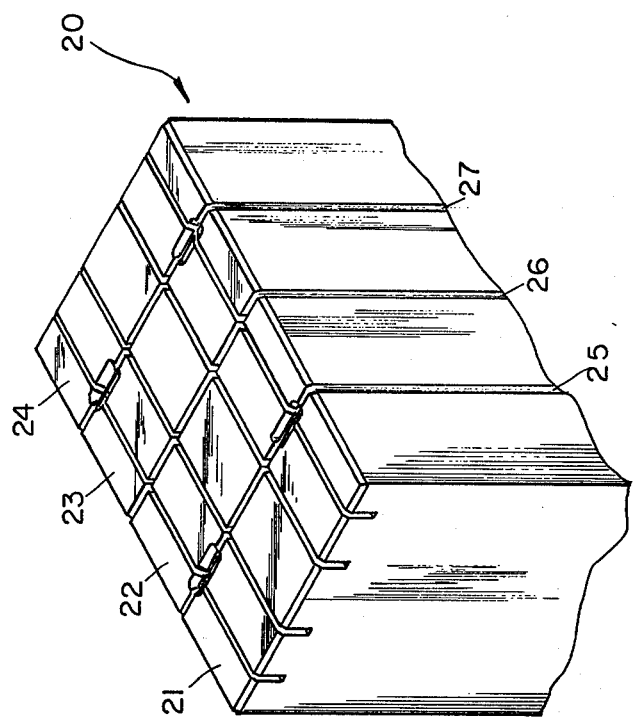
FIG. 2 is a fragmentary perspective of the cores provided on the male injection mold.

For the purposes of promoting an understanding of the principles of the invention, reference will now be made to the embodiments illustrated in the drawings and specific language will be used to describe the same.

It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
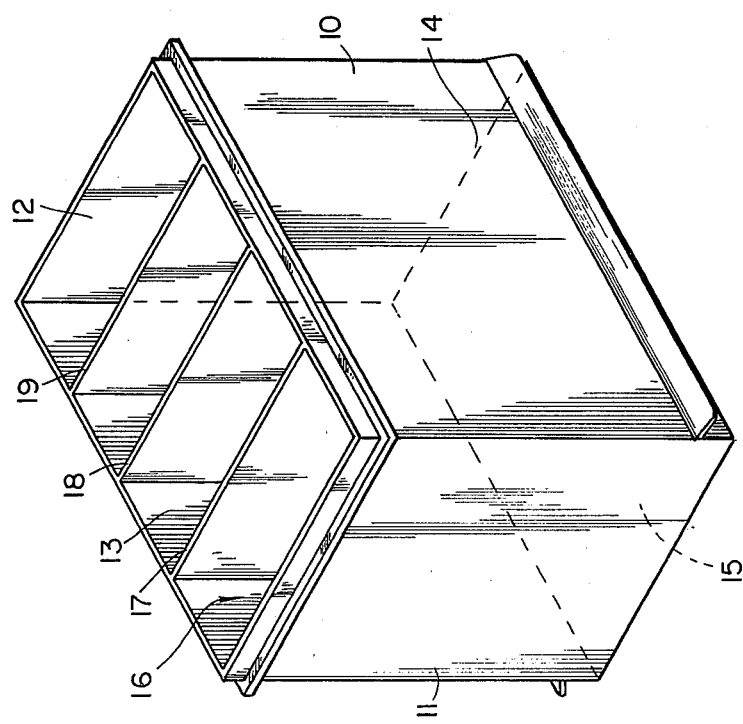
FIG. 1 is a perspective view of a container produced by the injection mold and method disclosed herein.

Referring now more particularly to FIG. 1, there is shown a container 10 produced from polyolefin having a pair of end walls 11 and 12 integrally joined to a pair of side walls 13 and 14 as well as a bottom wall 15. A plurality of compartments 16 are formed within the container and separated by thin walled partitions. In the embodiment shown in FIG. 1, the container includes four compartments separated by partitions 17, 18 and 19.

The male mold 20 (FIG. 2) is sized to fit slidably into the female mold 30 (FIG. 3) being spaced therefrom in order to form end walls 11 and 12 along with side walls 13 and 14 and bottom wall 15. The male mold includes four cores 21 through 24 to form the four compartments shown in container 10. The cores are spaced apart forming slots 25 through 27 to form the three partitions 17 through 19.

Figure 4:
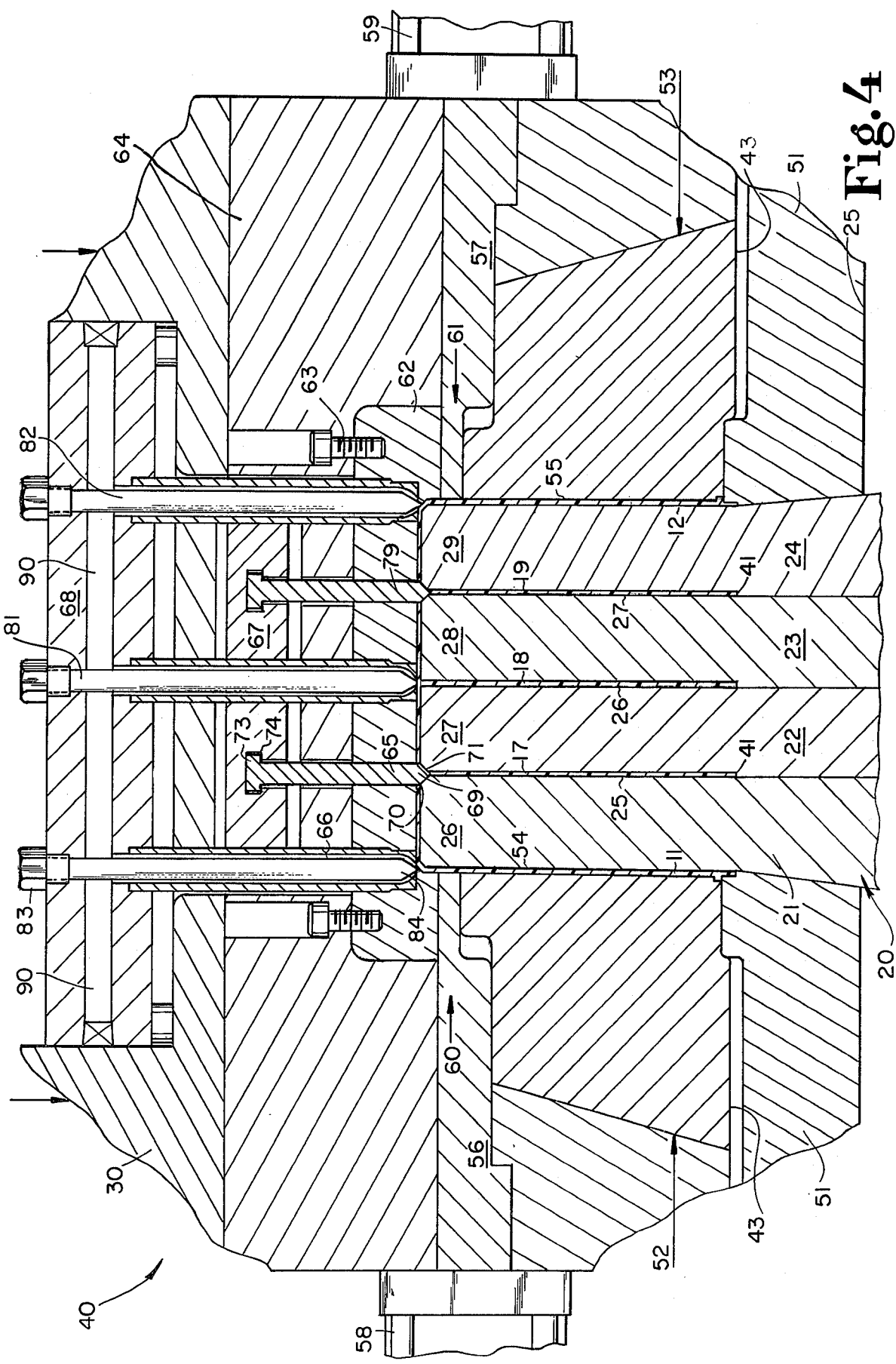
FIG. 4 is an enlarged fragmentary cross-sectional view taken along the line 4—4 of FIG. 3 and viewed in the direction of the arrows with the male mold shown inserted into the female mold.

The mold assembly 40 includes the male mold 20 and female mating mold 30 (FIG. 4). Mold 40 is identical to the mold disclosed in U.S. Pat. No. 3,473,197 issued to Wilds et al., which is herewith incorporated by reference, with the exception of the location of the wedge shaped projections for engaging the top distal ends of the cores and with the exception of the location of the injectors for injecting the plastic material into the mold while maintaining positioning of the top distal core ends. Thus, in the embodiment depicted in FIG. 4, mold 20 includes four cores 21, 22, 23 and 24 having bottom ends fixedly mounted in cantilevered fashion to a base 25. The top distal ends 26, 27, 28 and 29 of the four cores are spaced apart forming the slots 25, 26 and 27 for respectively forming the partitions 17 through 19. Slots 25 through 27 terminate at location 41 forming the upper edge portion of each partition. Each core is in contact with an adjacent core from location 41 to base 25 providing a rigid bottom portion of the male mold whereas the top distal ends when not positioned within the female mold are movable when large sideways pressure is exerted thereon.

Female mold 30 includes a pair of cavity side cams 43 mounted atop stipper plates 51 and are movable inwardly in the direction of arrows 52 and 53 until they are slightly spaced apart from cores 26 and 29 forming gaps 54 and 55 in which the end walls 11 and 12 of the container are formed. Female mold 30 further includes side locking members 56 and 57 mounted respectively to hydraulic cylinders 58 and 59 to move inwardly in the direction of arrows 60 and 61 to engage the outermost surface of the top distal ends 26 and 29 preventing outward movement of the cores. As previously explained, the side cams 43 as well as the side locking members 56 are disclosed in U.S. Pat. No. 3,473,197 and operate in the same manner.

Female mold 30 further includes a cavity insert 62 fixedly mounted by conventional fastening devices 63 to press member 64. A plurality of locks 65 and injectors 66 are mounted respectively to plates 67 and 68 in turn secured to press member 64. Locks 65 have wedge shaped bottom ends 69 fittable into the slots located between adjacent cores with the top edges 70 and 71 of each core being beveled to complementarily receive the wedge shape ends of the locks. The top end of each lock 65 includes an enlarged head 73 fitted within a cavity 74 provided in plate 67.

Figure 3:
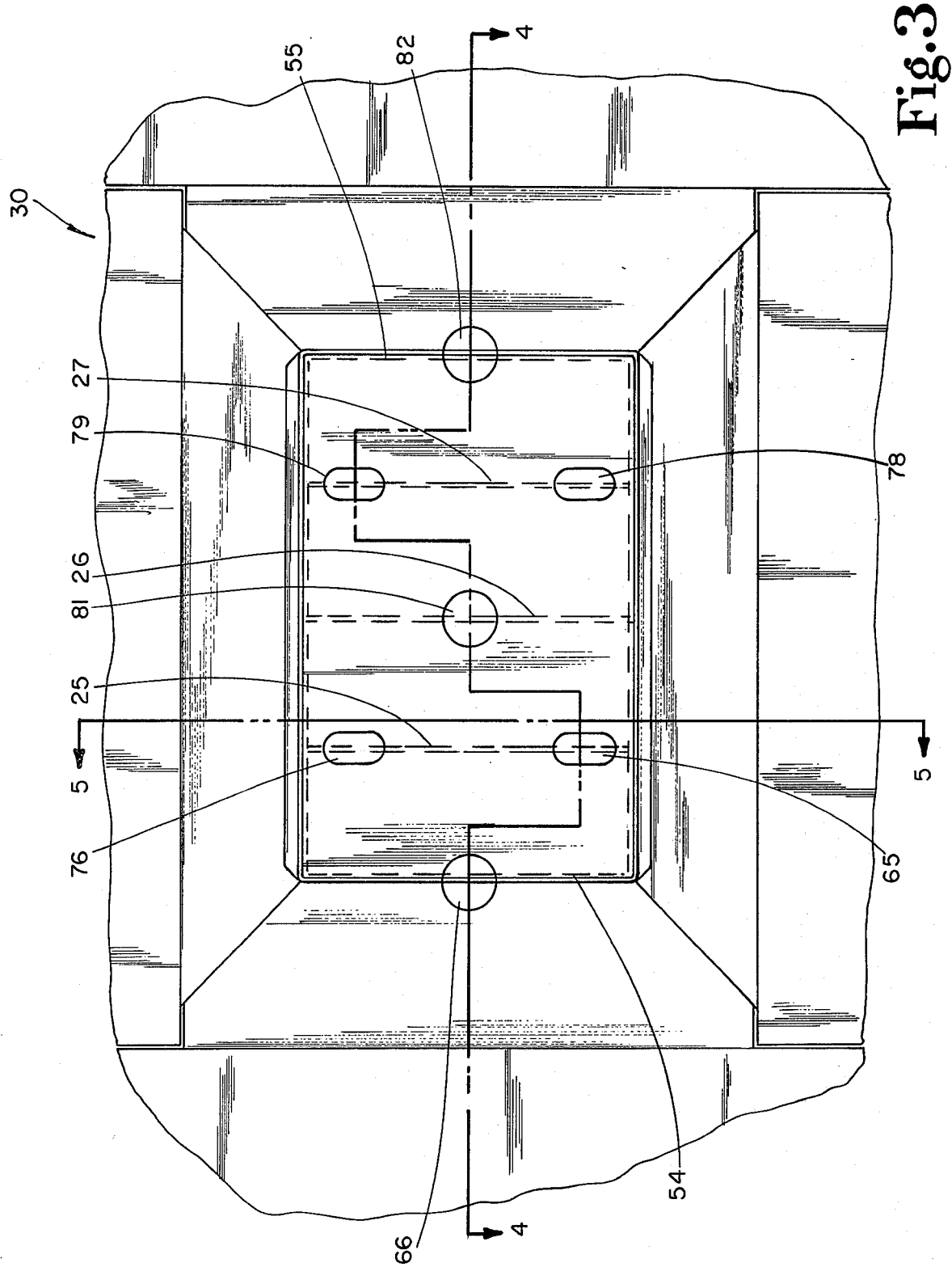
FIG. 3 is a fragmentary bottom view of the female injection mold.
Figure 5:
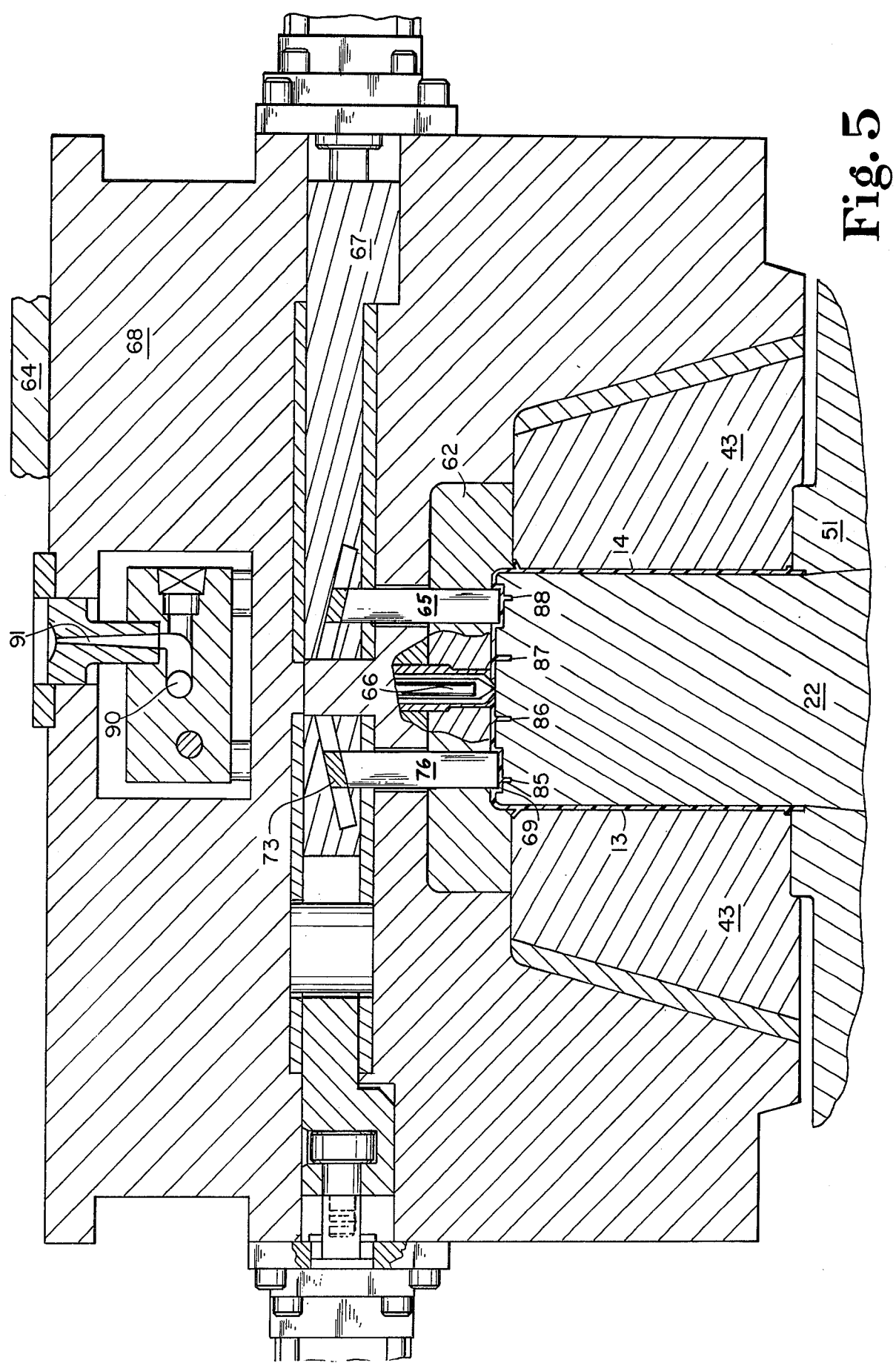
FIG. 5 is an enlarged fragmentary cross-sectional view taken along the line 5—5 of FIG. 3 and viewed in the direction of the arrows with the male mold inserted into the female mold.

In the embodiment shown in FIG. 4, the locks are arranged in pairs and positioned in every other slot. For example, a pair of locks 76 and 65 are shown in FIG. 3 as being arranged for slot 25 shown by the phantom lines whereas a pair of locks 78 and 79 are arranged to extend into slot 27. The remaining slots 54, 26 and 55 have three injectors 66, 81 and 82 aligned therewith. Injectors 66, 81 and 82 have top ends fixedly secured by internally threaded bushings 83 to plate 68. The bottom outlet end 84 of each injector opens between cavity members 62 and the top of the cores to allow plastic material to be injected into the mold and more specifically into slots 54, 26 and 55. A plurality of transverse channels 85 through 88 (FIG. 5) extend across cores 26 through 29 allowing fluid communication of the plastic melt from slot to slot and into the openings 54 and 55 between the male and female molds.

Each injector 66, 81 and 82 is in fluid communication with the source of pressurized fluid via a passage 90 extending through plate 68 thereby insuring that each injector applies the same pressure to the mold assembly. Passage 90 in turn is in fluid communication with passage 91 in turn connected to the external source of plastic melt. The construction of the injectors, female mold and locks are identical to that previously disclosed in U.S. Pat. No. 3,473,197 with exception of the location of the locks and injectors. Thus, as described in U.S. Pat. No. 3,473,197, the top ends 73 (FIG. 5) of the locks 65 and 76 are engaged by a slide mechanism 67 in turn activated by a hydraulic cylinder to vertically move the locks to and from a position between adjacent cores.

The separable mold assembly for injection molding the plastic container 10 having interior compartments separated by thin walls includes a male mold 20 and female mold 30 slidably mounted together. The male mold includes a plurality of cores cantileveredly mounted to base 25 with the cores spaced apart defining partition forming spaces or deep longitudinal slots extending transversely across the cores. The slots form the partitions within the container whereas the free distal ends of the cores in conjunction with the cavity insert 62 form the bottom wall of the container. The female mold is movably mounted to enclose the cores but is spaced therefrom in order to form a gap thereby forming the side and end walls of the container. A plurality of parallel wedges or fingers mounted to the female mold are movable into the slots positioned between the cores to limit movement together of the cores so engaged. The side locking means 56 and 57 mounted with the cavity or female mold assembly are movable in a limited direction transverse to the vertical direction of core extension. The locking means when positioned inwardly extend sideways against the outermost core surface limiting outward movement thereof. A plurality of injector means are mounted to the female mold and are aligned with slots 26, 54 and 55 and are operable to inject plastic melt into the slots thereby forming the container. The injectors are located in the slots not having the wedges positioned therein and inject a plastic melt at a certain pressure to cooperatively with the wedges limit movement of the free distal ends of the cores. In one embodiment, the thickness of the partitions is 0.070 to 0.090 inches with the injection pressure being 20,000 psi. The pressure exerted by the injectors must be sufficient to limit movement of the cores aligned therewith in order to achieve uniform thickness of the partitions. The press or resistive means is connected to the wedges, injectors and molds to limit movement thereof as the plastic material reaches the peak pressure.

The drawings depict a four compartment container; however, it is to be understood that a container having any number of compartments may be produced in accordance with the present invention. Further, the drawings depict the wedges as being aligned alternately with the injectors relatively to the slots forming the partitions. That is, a pair of wedges are shown located in one slot, an injector in the next slot and another pair of wedges in the following slot until all the slots are aligned with either injectors or wedges. In lieu of alternately locating the wedges and injectors, the invention disclosed herein contemplates and includes locating a series of wedges in adjacent slots followed by a series of injectors located in the remaining slots. In addition, the present invention includes locating the wedges and injectors at a variety of positions along the length of each slot although the drawings show one embodiment of the present invention wherein the wedges are located at opposite extremes of a particular slot with the injector located midway along the length of another slot.

Due to the wedge shaped ends of the locks, the pressure exerted by the injectors is insufficient to force the locks outwardly from the cores. Upon filling of the mold with the plastic melt, the locks are moved upwardly allowing the melt to fill the space previously occupied by the wedge shaped bottom ends of the locks. Likewise, as described in U.S. Pat. No. 3,473,197, the plastic melt also fills the space occupied by the ends of the side locking means 56 and 57 as they are withdrawn by hydraulic cylinders 58 and 59.

The method of injection molding a plastic container according to the present invention includes the step of spacing apart a plurality of upstanding male mold cores each a distance equal to the desired thickness of the partitions. Next, a female mold is positioned around the male mold but is spaced therefrom to form the container therebetween. Wedges are then inserted between some of the cores and plastic material is injected between the remaining cores. The wedges are maintained in place to limit movement of the cores so engaged while the injection pressure is maintained to limit movement of the remaining cores until the plastic melt has flowed between all of the cores and between the male and female molds. The fluid pressure is equalized between all injectors by means of a common passage or source of melt. Further, the method contemplates and includes arranging alternatively the injectors and wedges between the cores so that a single core is positioned between at least one wedge and one injector. The wedges are also arranged in pairs located between the cores.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. A mold assembly for injection molding a container having parallel thin walled partitions comprising:
    a base;
    a plurality of cores cantileveredly mounted to said base, said cores spaced apart defining partition forming spaces and having free distal ends to form the bottom of said container;
    a cavity assembly movably mounted to enclose said cores but spaced therefrom across a gap to form said container therein;
    parallel wedges mounted on said cavity assembly and movable therewith to an engaging position whereat said wedges extend into some of said spaces between and against adjacent free distal ends of said cores limiting movement together of said cores so engaged;
    side locking means mounted with said cavity assembly for limited motion transverse to the direction of core extension and when in one position extending into sideways engagement with the outermost cores limiting outward movement thereof; and,
    injection means mounted with said cavity assembly and aligned with those of said spaces not associated with said wedges and being spaced apart from said wedges a distance at least equal to from one of said spaces to another of said spaces and operable to inject plastic material into those spaces at a pressure sufficient to limit movement of said cores forming those spaces and cooperatively with said wedges limiting movement of said cores and by stabilizing said free distal ends forming said partition of uniform thickness.

2. The mold assembly of claim 1 wherein said wedges are arranged in pairs with at least one such pair being located in each of said spaces receiving said wedges, said injection means includes a plurality of outlets with at least one outlet aligned with those spaces not associated with said wedges.

3. The mold assembly of claim 1 and further comprising press means having said wedges mounted thereon and operable to force said wedges between said cores and hold same without further movement as said injection means injects plastic material to said pressure with said press means further operable to subsequently disengage said wedges from between said cores to permit flow of plastic material in areas vacated by said wedges.

4. The mold assembly of claim 3 wherein said side locking means is operable to disengage said outermost cores subsequent to said injection means reaching said pressure to permit the flow of plastic material in areas vacated by said side locking means adjacent said outermost cores.

5. A separable mold assembly for injection molding a plastic container having compartments separated by thin walls comprising:
    a male mold with deep longitudinal slots extending transversely thereacross forming a plurality of upstanding cores to form said compartments separated by said thin walls;
    a female mold slidably mounted to said male mold and spaced therefrom to form said container therebetween;
    a plurality of wedge shaped fingers mounted to said female mold and movable into said slots as said female mold closes on said male mold to limit movement of said cores;
    a plurality of injector means mounted to said female mold and aligned with at least one of said slots and being spaced from said fingers at least a distance equal to from one of said slots to another of said slots and to inject plastic material into said slots between said male mold and female mold forming said container with said thin walls, said injector means aligned with slots not having wedges therein to inject said material at a certain pressure to cooperatively with said wedges limit movement of said cores; and, resistive means connected to said wedges, injector means and female and male molds to limit movement thereof as said plastic material reaches said certain pressure.

6. The mold assembly of claim 5 wherein:

said female mold includes passages containing plastic material in fluid communication with said injector means equalizing said pressure exerted by said injector means.

7. The mold assembly of claim 5 wherein said wedges are arranged in pairs with a single pair being located alternately in every other slot and said injector means including an injector aligned with each of the remaining slots in alternate fashion with said wedges.

8. The mold assembly of claim 7 wherein each of said wedges in a pair are located at opposite extremes of a slot with said injectors located midway between the opposite extremes of other slots.

9. A method of injection molding a plastic container having compartments separated by thin walled partitions comprising the steps of:

spacing apart a plurality of upstanding cores of a male mold each a distance equal to the desired thickness of said partitions;

positioning a female mold around said male mold but spaced therefrom to form said container therebetween;

inserting wedges between some of said cores;

injecting plastic material at a certain pressure with injectors between the remaining cores and between the male mold and said female mold; and, maintaining said wedges in place to limit movement of cores engaged by said wedges while maintaining said pressure to limit movement of the remaining cores until said plastic material has flowed between all of said cores and between said cores and female mold.

10. The method of claim 9 and comprising the additional step of equalizing fluid pressure between all injectors by means of equalizing channels.

11. The method of claim 10 and comprising the additional step of alternately arranging said injectors and wedges between said cores so that a single core is positioned between at least one wedge and one injector.

12. The method of claim 11 and comprising the additional step of arranging said wedges in pairs located between cores.

13. The mold assembly of claim 1 wherein said spaces are arranged into a first group of said spaces and a second group of said spaces with said second group of said spaces interspersed in alternate fashion with said first group of said spaces, said wedges being located only in the spaces of said first group of said spaces whereas said injection means located in said spaces in said second group of said spaces.

* * * * *